United States Patent
Stauter (10) Patent No.: US 11,884,128 B2
(45) Date of Patent: Jan. 30, 2024

(54) FAN STATOR CONSTRUCTION TO MINIMIZE AXIAL DEPTH

(71) Applicant: Carrier Corporation, Palm Beach Gardens, FL (US)

(72) Inventor: Richie C. Stauter, Fayetteville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 79 days.

(21) Appl. No.: 16/201,463

(22) Filed: Nov. 27, 2018

(65) Prior Publication Data

US 2019/0184785 A1 Jun. 20, 2019

Related U.S. Application Data (60) Provisional application No. 62/599,859, filed on Dec. 18, 2017.

(51) Int. Cl.
*B60H 1/00* (2006.01)
*B60H 1/32* (2006.01)
(Continued)

(52) U.S. Cl.
CPC ....... *B60H 1/00464* (2013.01); *B60H 1/3226* (2013.01); *B60H 1/3229* (2013.01);
(Continued)

(58) Field of Classification Search
CPC ............. B60H 1/00464; B60H 1/3226; B60H 1/3229; B60H 1/3232; F04D 19/002;
(Continued)

(56) References Cited

U.S. PATENT DOCUMENTS

| 2,154,313 A | * | 4/1939 | McMahan ............. | F04D 29/541 415/210.1 |
|---|---|---|---|---|
| 5,224,447 A | | 7/1993 | Braatz et al. | |

(Continued)

FOREIGN PATENT DOCUMENTS

| CN | 1704613 A | 12/2005 |
|---|---|---|
| CN | 201273293 Y | 7/2009 |

(Continued)

OTHER PUBLICATIONS

European Office Action; International Application No. 18213400.7-1012; International Filing Date: Dec. 18, 2018; dated Jan. 24, 2020; 6 pages.

(Continued)

*Primary Examiner* — Tavia Sullens
(74) *Attorney, Agent, or Firm* — CANTOR COLBURN LLP (57) ABSTRACT

A transport refrigeration unit for use with a transport trailer includes a structural framework mountable to a wall of the transport trailer, a condenser heat exchanger unit mounted to the structural framework, an evaporator housing separated from the condenser heat exchanger by a distance, and at least one condenser fan assembly positioned aft of the condenser heat exchanger unit and forward of the evaporator housing. The at least one condenser fan assembly includes a fan rotor defining an inlet end. The fan rotor is rotatable about a fan axis. A casing defines a central opening and the fan rotor is arranged within the central opening. The casing includes a plurality of openings spaced about a periphery of the casing. A portion of an airflow moving through the at least one condenser fan assembly is expelled from the at least one condenser fan assembly radially via the plurality of openings.

11 Claims, 9 Drawing Sheets

(51) Int. Cl.
*F04D 29/54* (2006.01)
*F04D 19/00* (2006.01)

(52) U.S. Cl.
CPC ......... *B60H 1/3232* (2013.01); *F04D 19/002* (2013.01); *F04D 29/542* (2013.01); *F04D 29/547* (2013.01)

(58) Field of Classification Search
CPC ........ F04D 25/08; F04D 25/12; F04D 25/166; F04D 29/547; F04D 29/542; F04D 29/544
See application file for complete search history.

(56) References Cited

U.S. PATENT DOCUMENTS

| | | | |
|---|---|---|---|
| 5,236,306 A | | 8/1993 | Hozak |
| 5,582,507 A | * | 12/1996 | Alizadeh ............... F04D 29/326 416/189 |
| 6,139,265 A | | 10/2000 | Alizadeh |
| 6,435,817 B1 | * | 8/2002 | Hollenbeck ........... F04D 29/601 415/119 |
| 6,572,333 B2 | | 6/2003 | Fujinaka |
| 7,083,387 B2 | | 8/2006 | Chen et al. |
| 7,622,838 B2 | | 11/2009 | Watanabe et al. |
| 7,794,204 B2 | | 9/2010 | Stevens et al. |
| 7,811,069 B2 | | 10/2010 | Fleig |
| 8,616,864 B2 | | 12/2013 | Nakamura et al. |
| 2006/0093476 A1 | | 5/2006 | Stanley et al. |
| 2009/0211286 A1 | | 8/2009 | Stauter et al. |
| 2009/0211287 A1 | * | 8/2009 | Steele .................. B60H 1/3232 416/189 |
| 2010/0040458 A1 | * | 2/2010 | Bushnell ............... F04D 29/164 415/173.6 |
| 2015/0226224 A1 | | 8/2015 | De Filippis |
| 2015/0252812 A1 | | 9/2015 | Sauer et al. |
| 2016/0061220 A1 | | 3/2016 | Stanley |
| 2016/0138610 A1 | | 5/2016 | Jung et al. |
| 2016/0312792 A1 | | 10/2016 | Fujimaki et al. |
| 2016/0327057 A1 | | 11/2016 | Wu et al. |
| 2017/0051747 A1 | | 2/2017 | Nakamura et al. |
| 2017/0159663 A1 | | 6/2017 | Jang |

FOREIGN PATENT DOCUMENTS

| | | |
|---|---|---|
| CN | 104314844 A | 1/2015 |
| CN | 104405654 A | 3/2015 |
| CN | 104454592 A | 3/2015 |
| CN | 106015104 A | 10/2016 |
| CN | 106224268 A | 12/2016 |
| CN | 107181334 A | 9/2017 |
| EP | 1712800 A1 | 10/2006 |
| EP | 2821653 A1 | 1/2015 |
| JP | D1059301 S | 1/2000 |
| JP | 2005194899 A | 7/2005 |
| WO | 2015040870 A1 | 3/2015 |
| WO | 2017137115 A1 | 8/2017 |

OTHER PUBLICATIONS

Extended European Search Report; International Application No. 18213400.7-1012; International Filing Date: Dec. 18, 2018; dated May 20, 2019; 10 pages.

European Office Action; European Application No. 18213400.7-1012; dated Jan. 24, 2022; 4 pages.

* cited by examiner

FAN STATOR CONSTRUCTION TO MINIMIZE AXIAL DEPTH

CROSS-REFERENCE TO RELATED APPLICATIONS

This application claims the benefit of U.S. Provisional Application Ser. No. 62/599,859, filed Dec. 18, 2017, which is incorporated herein by reference in its entirety.

BACKGROUND

Exemplary embodiments relate generally to transport refrigeration systems and, more particularly, to a condenser fan assembly for use in a transport refrigeration system.

Transport refrigeration systems are commonly employed in connection with refrigerated transport trailers used in shipping perishable goods. The transport trailer is adapted to be connected to and towed by a truck tractor. The transport refrigeration system includes a refrigeration unit, an electric generator assembly and an engine for driving the electric generator, all supported on a framework structural support configured to be mounted to the front wall of the trailer.

European regulations strictly limit the length of a transport refrigeration trailer and how far a transport refrigeration unit can protrude from the front wall of such trailers. These limits severely restrict the front-to-back space (depth) available within the unit for component arrangement. As a result, the axial (depth-wise) extent of all components must be minimized without impacting the functionality of the unit. This constraint particularly impacts the air management system components, i.e., fans, which must not only be compact while providing high performance, but also take full advantage of the space available to provide a flow path sufficient to minimize flow losses.

BRIEF DESCRIPTION

According to an embodiment, a transport refrigeration unit for use with a transport trailer includes a structural framework mountable to a wall of the transport trailer, a condenser heat exchanger unit mounted to the structural framework, an evaporator housing separated from the condenser heat exchanger by a distance, and at least one condenser fan assembly positioned aft of the condenser heat exchanger unit and forward of the evaporator housing. The at least one condenser fan assembly includes a fan rotor defining an inlet end. The fan rotor is rotatable about a fan axis. A casing defines a central opening and the fan rotor is arranged within the central opening. The casing includes a plurality of openings spaced about a periphery of the casing. A portion of an airflow moving through the at least one condenser fan assembly is expelled from the at least one condenser fan assembly radially via the plurality of openings.

In addition to one or more of the features described herein, or as an alternative, in further embodiments substantially all of the airflow output from a discharge end of the at least one condenser fan assembly turns radially relative to the fan axis at a position upstream from the evaporator housing.

In addition to one or more of the features described herein, or as an alternative, in further embodiments the casing of the at least one condenser fan assembly further comprises a shroud frame having a hollow interior, a plurality of pylons extending from a surface of the shroud frame, and a stator coupled to the plurality of pylons. The stator includes a plurality of guide vanes defining a discharge end of the fan assembly. The stator is arranged downstream from the fan rotor with respect to the airflow.

In addition to one or more of the features described herein, or as an alternative, in further embodiments the shroud frame has a generally planar configuration.

In addition to one or more of the features described herein, or as an alternative, in further embodiments axial length of the shroud frame is less than an axial length of the fan rotor.

In addition to one or more of the features described herein, or as an alternative, in further embodiments the fan rotor includes a plurality of fan blades and an axial length of the shroud frame is less than an axial length of the plurality of fan blades.

In addition to one or more of the features described herein, or as an alternative, in further embodiments the plurality of pylons maximize the distance between the plurality of fan blades and the plurality of guide vanes.

In addition to one or more of the features described herein, or as an alternative, in further embodiments fan rotor further comprises a central hub, and the shroud frame is axially offset from central hub.

In addition to one or more of the features described herein, or as an alternative, in further embodiments the shroud frame is arranged upstream from the central hub.

In addition to one or more of the features described herein, or as an alternative, in further embodiments the plurality of pylons is spaced about a periphery of the shroud frame and a plurality of openings is defined between adjacent pylons of the plurality of pylons.

In addition to one or more of the features described herein, or as an alternative, in further embodiments the plurality of pylons is spaced equidistantly.

In addition to one or more of the features described herein, or as an alternative, in further embodiments the plurality of pylons includes a first pylon, a second pylon, and a third pylon, and a distance between the first pylon and the second pylon is different that a distance between the second pylon and the third pylon.

In addition to one or more of the features described herein, or as an alternative, in further embodiments the plurality of pylons extend substantially perpendicular to the surface of the shroud frame.

In addition to one or more of the features described herein, or as an alternative, in further embodiments the plurality of pylons extend at an angle between 0 degrees and 90 degrees relative to the surface of the shroud frame.

In addition to one or more of the features described herein, or as an alternative, in further embodiments the shroud frame, the plurality of pylons, the stator hub, and the plurality of guide vanes are integrally formed.

According to another embodiment, a transport refrigeration unit for use with a transport trailer includes a structural framework mountable to a wall of the transport trailer, a condenser heat exchanger unit mounted to the structural framework, an evaporator housing separated from the condenser heat exchanger by a distance, and at least one condenser fan assembly for blowing air toward the evaporator housing and over the condenser heat exchanger unit. The at least one condenser fan assembly includes a fan rotor rotatable about a fan axis. A casing defines a central opening. The fan rotor is arranged within the central opening. The casing includes a plurality of openings spaced between pylons that extend axially. The condenser fan assembly is in close proximity to the evaporator housing such that a portion of an airflow moving through the at least one condenser fan assembly is expelled from the at least one condenser fan assembly radially via the plurality of openings due to the proximity of the evaporator housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Referring now to FIGS. 1-4, an example of a transport refrigeration system 20 is illustrated. As shown, the transport refrigeration system 20 includes a trailer 22 towed or otherwise transported by a tractor 24 including an operator's compartment or cab 26 and also including an engine (not shown), which acts as the drivetrain system of the system 20. The system 20 additionally includes a transport refrigeration unit 30 configured to maintain cargo located within the trailer 22 at a selected temperature by cooling the cargo space of the trailer 22. The transport refrigeration unit 30 is mounted at the front wall 28 of the trailer 22, Although the transport refrigeration unit 30 is illustrated as being mounted to a trailer 22 pulled by a tractor 24, in other embodiments, the transport refrigeration unit 30 may be adapted to cool a confined space, such as a rail car for example.

The transport refrigeration unit 30 dudes a structural framework, designated generally at 32, that forms a skeletal structure from which various components of the transport refrigeration unit 30 are supported. The transport refrigeration unit 30 includes an outer cover 34 (FIG. 1) supported on the structural framework 32. As is common, various panels or other portions of the outer cover 34 may be hinged and/or removable to provide efficient access to the interior of the transport refrigeration unit 30 to perform routine maintenance. The cover 34 is configured to cover not only the framework 32, but also all of the components of the refrigeration unit 30, including but not limited to a compressor (not shown), an evaporator and associated evaporator fan/motor assembly (not shown) disposed within the confines of the evaporator housing 36, a condensing heat exchanger 38, and the at least one condenser fan assembly 40.

The transport refrigeration unit 30 is typically powered by a diesel engine 42, separate from the engine of the tractor 24. The engine 42 drives an electric generator (not shown) that produces and supplies electrical power to portion of the transport refrigeration unit including a compressor motor (not shown) that drives the compressor (not shown), the evaporator fan motor (not shown), and the motors associated with the one or more condenser fan assemblies 40, as well as any other electrically powered equipment associated with the transport refrigeration unit 30.

Figure 1:
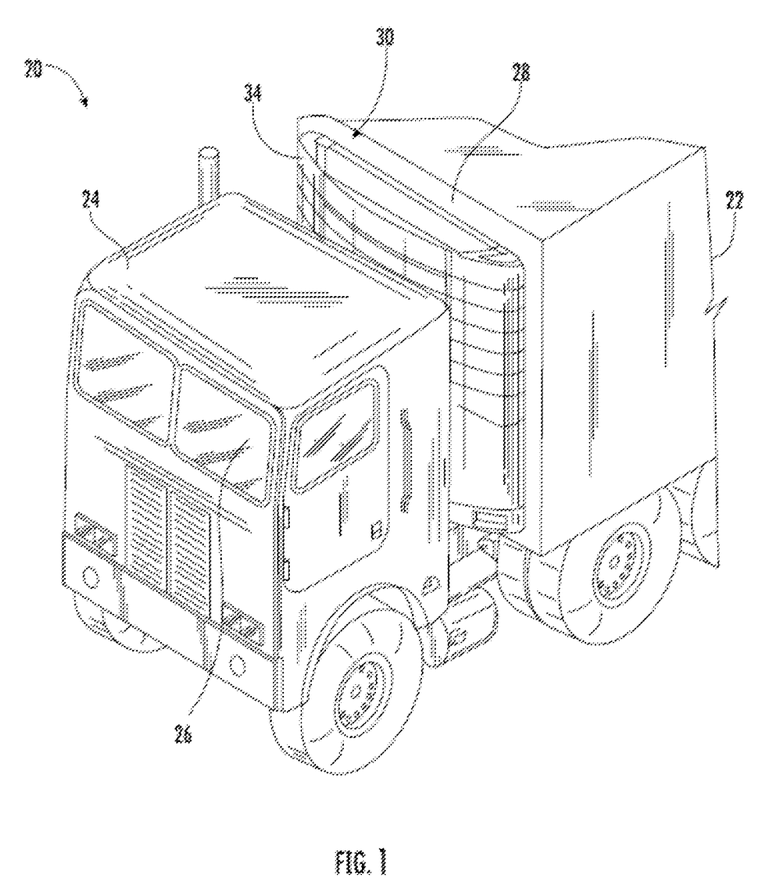
FIG. 1 is perspective view of a portion of a transport refrigeration system.
Figure 2:
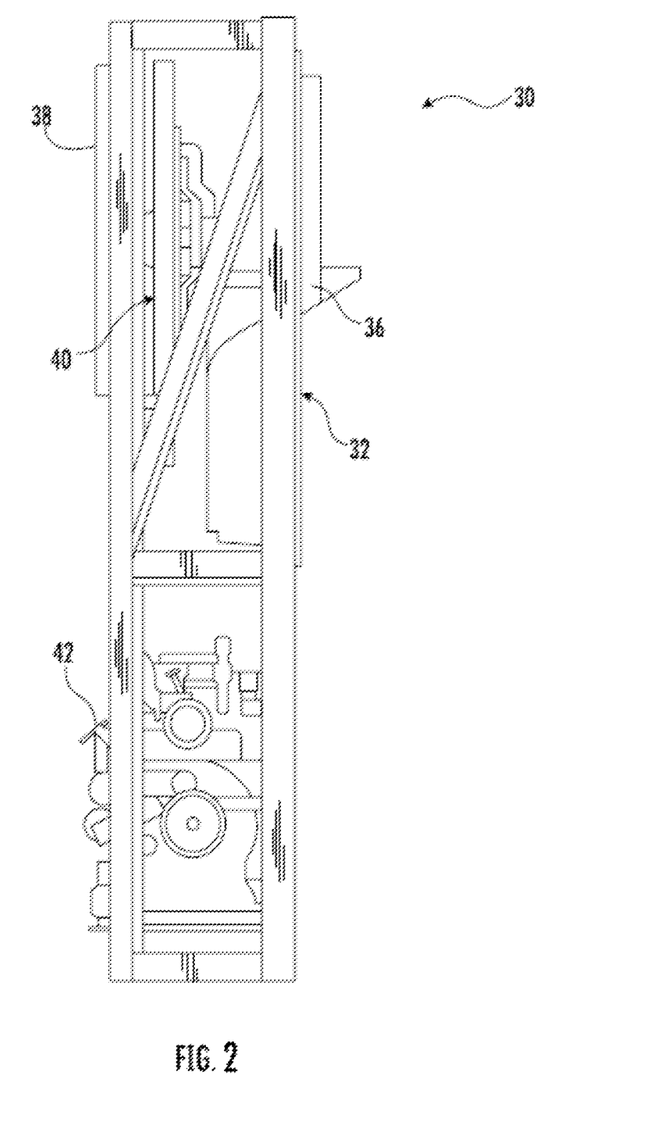
FIG. 2 is a side view of a portion of a transport refrigeration unit of a transport refrigeration system.
Figure 3:
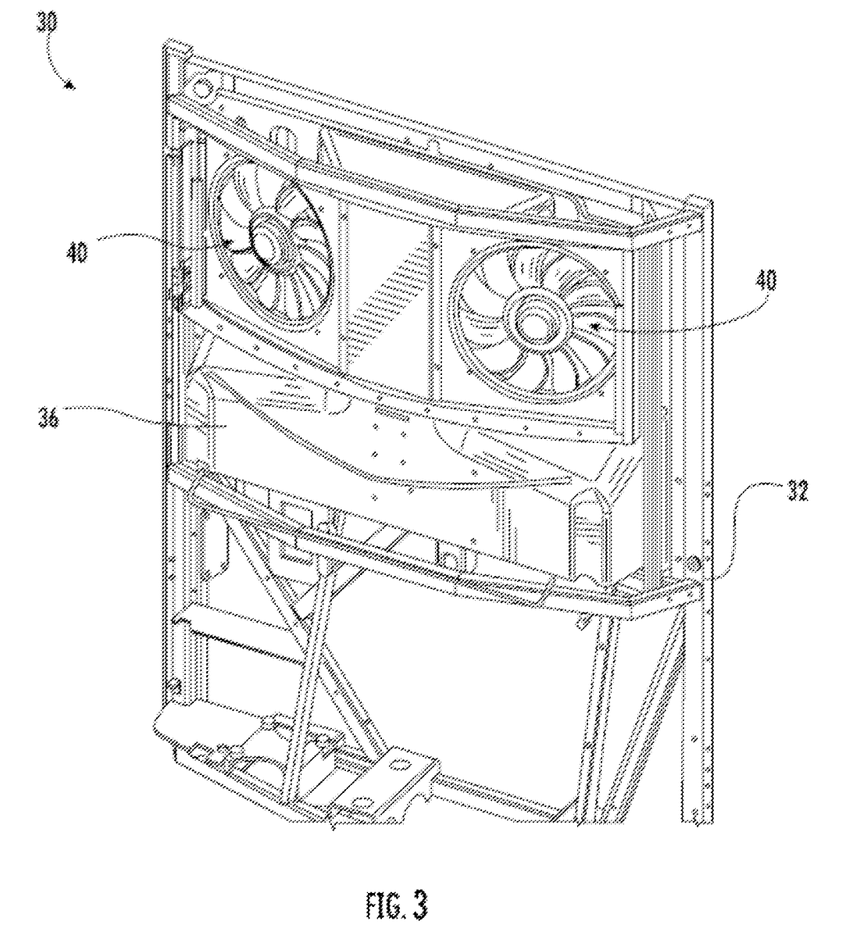
FIG. 3 is a perspective view of a portion of a transport refrigeration unit of a transport refrigeration system.
Figure 4:
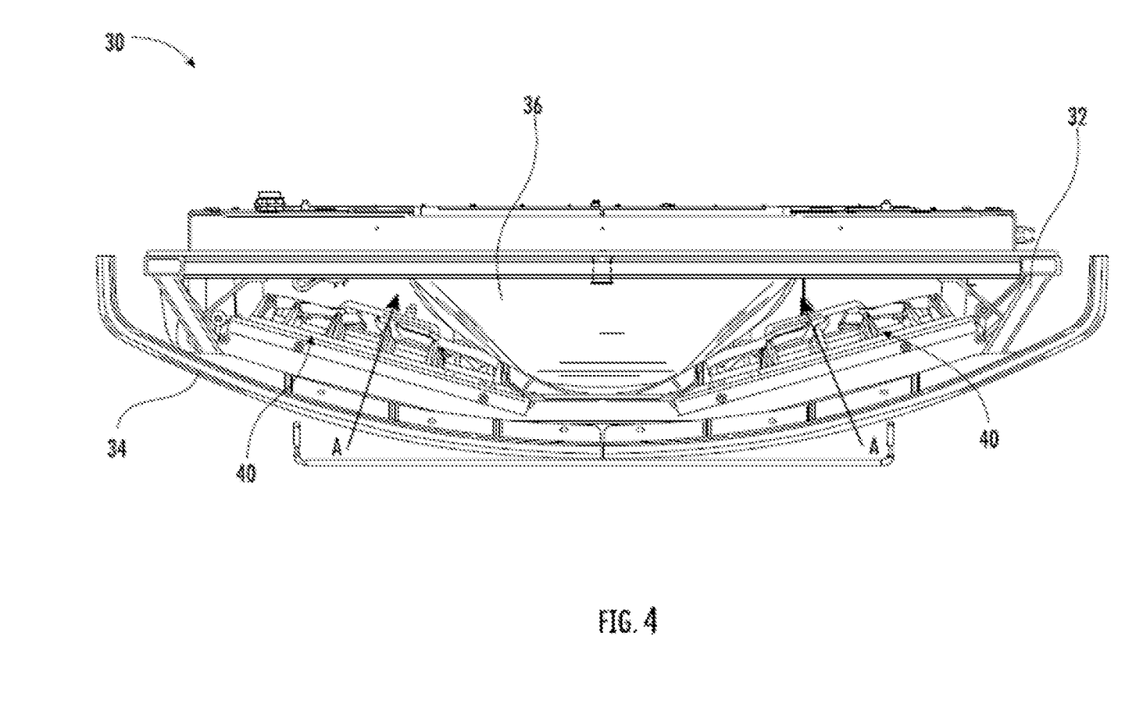
FIG. 4 is a top view of the portion of the transport refrigeration unit FIG. 3.
Figure 5:
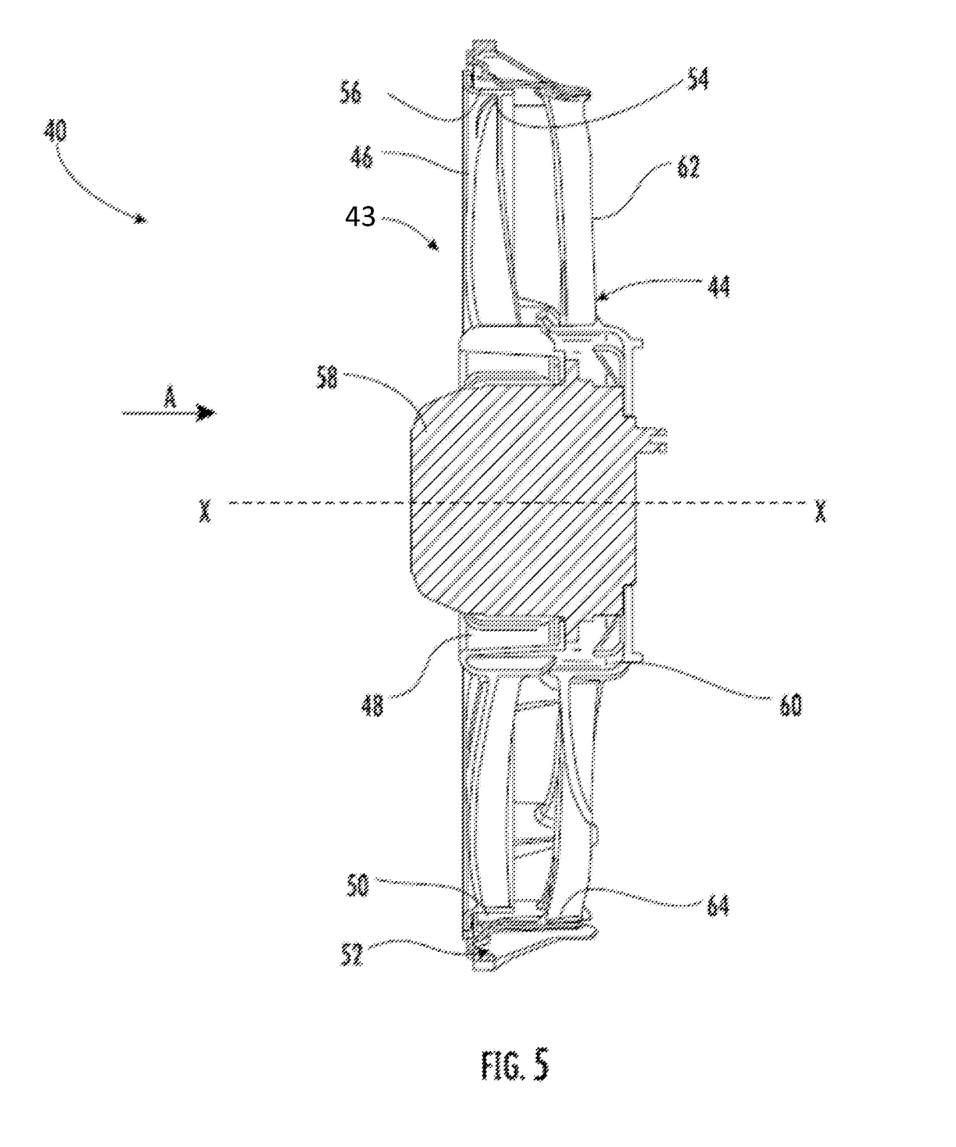
FIG. 5 is a side view of a condenser fan assembly of a transport refrigeration unit according to an embodiment.
Figure 6:
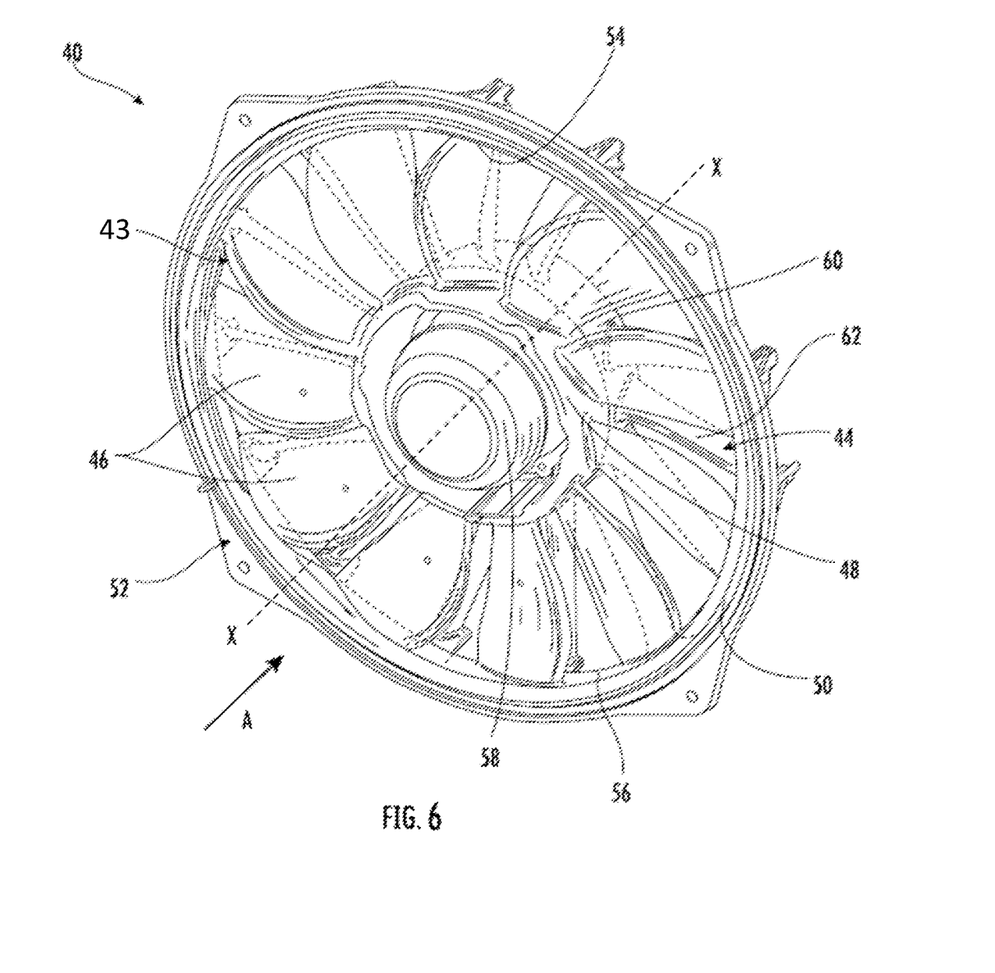
FIG. 6 is a perspective view of an inlet end of a condenser fan assembly of FIG. 5 according to an embodiment.
Figure 7:
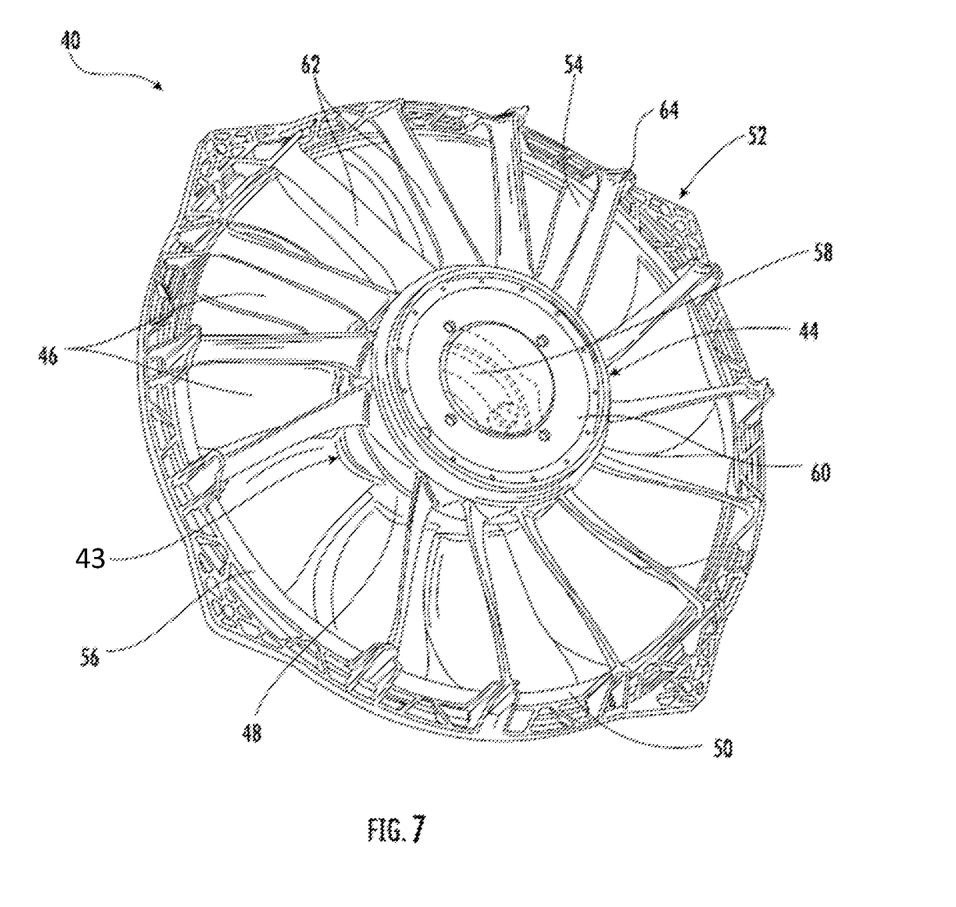
FIG. 7 is a perspective view of a discharge end of the condenser fan assembly of FIG. 5 according to an embodiment.

In the illustrated, non-limiting embodiment, best shown in FIGS. 3 and 4, the transport refrigeration unit 30 includes two condenser fan assemblies 40, positioned above the diesel powered engine 42 and the electric generator (not shown) driven by the engine 42, at the forward side of the structural framework 32, aft of the condenser 38 and forward of the evaporator housing 36. The condenser fan assemblies 40 may be arranged within the same plane, or alternatively, may be arranged at an angle relative to one another, as shown in the FIGS. By positioning the condenser fan assemblies 40 vertically and generally parallel to the plane of the evaporator housing 36, the air, illustrated schematically with arrow A, output from the condenser fan assemblies 40 flows naturally along a horizontal axis towards the evaporator housing 36. However, the evaporator housing 36 presents a barrier to further progression of the air flow, such that a major portion of the air flow discharged from the condenser fan assemblies 40 must turn ninety degrees and flow upward toward the top of the transport refrigeration unit 30 to be released to the atmosphere. In addition, about a quarter of the flow is designed to exit downwards through the engine compartment to help cool the engine container therein. The flow going downward has to make about a hundred and fifty degree turn to get around the evaporator housing 36. As a result, in conventional systems, the amount of flow provided to the engine compartment is limited.

With reference now to FIGS. 5-9, an example of a condenser fan assembly 40 usable in a transport refrigeration unit 30 is shown in more detail. In the illustrated, non-limiting embodiment, the condenser fan assembly 40 is an axial flow fan including a fan rotor 43 and a fan stator 44 arranged in a serial airflow relationship; however, it should be understood that other suitable types of fans, such as a mixed flow fan for example, are also within the scope of the disclosure.

The fan rotor or impeller 43 has a plurality of fan blades 46 extending radially outwardly from a rotor hub 48 into an opening 50 defined by an outer casing 52. Although the radially outer end 54 of each fan blade 46 is illustrated as being connected to or integrally formed with a fan shroud 56, embodiments where the impeller 43 does not include a shroud 56 are also contemplated herein. A motor 58 operably coupled to the fan rotor 43 may be used to rotate the fan rotor 43 and the fan blades 46 about the fan axis X to cause air A to be drawn in and pass through the opening 50. The motor 58 may be oriented such that an axis of rotation of the motor 58 is arranged parallel to or coaxial with the fan axis X.

The stator 44 includes a stationary central hub 60 and a plurality of stationary guide vanes 62 extending radially outward from the hub 60. The distal ends 64 of the one or more of the guide vanes 62 may, but need not be connected to the outer casing 52. The guide vanes 62 are located downstream from the fan blades 46 relative to the direction of airflow A through the opening 50. The plurality of guide vanes 62 may be formed with any configuration, for example a planar configuration, or configurations including lean or sweep in the circumferential or axial directions. In operation, the fan rotor 43 is rotated at relatively high speeds to induce the flow of air A through the casing 52, and in the process it creates a swirl in the direction of the fan rotation, such that the air A has both an axial component and a tangential component. The guide vanes 62 are disposed and shaped to straighten the flow exiting from the fan rotor 43.

Figure 8:
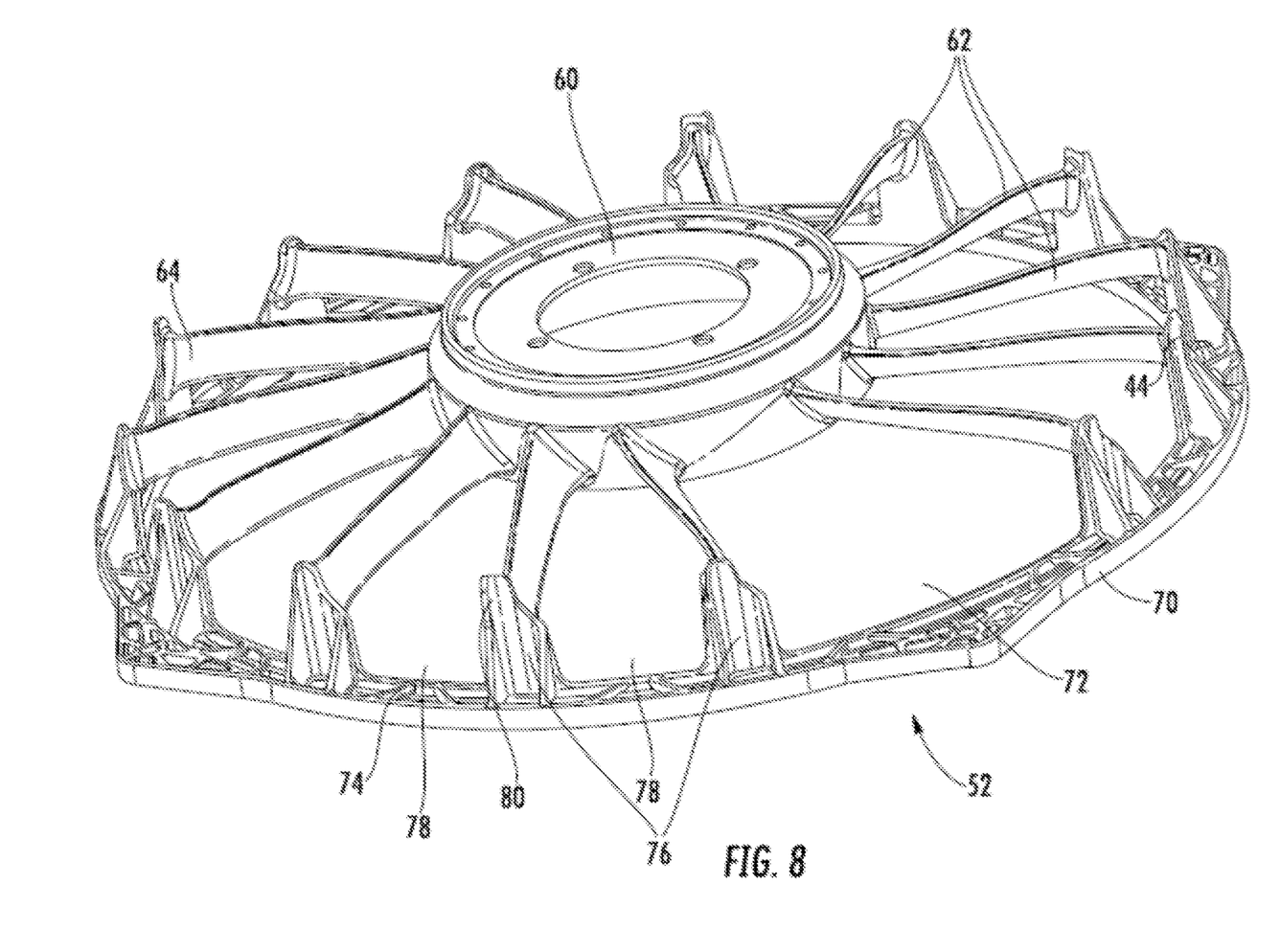
FIG. 8 is a perspective view of a stator and casing of the condenser fan assembly of FIG. 5 according to an embodiment.
Figure 9:
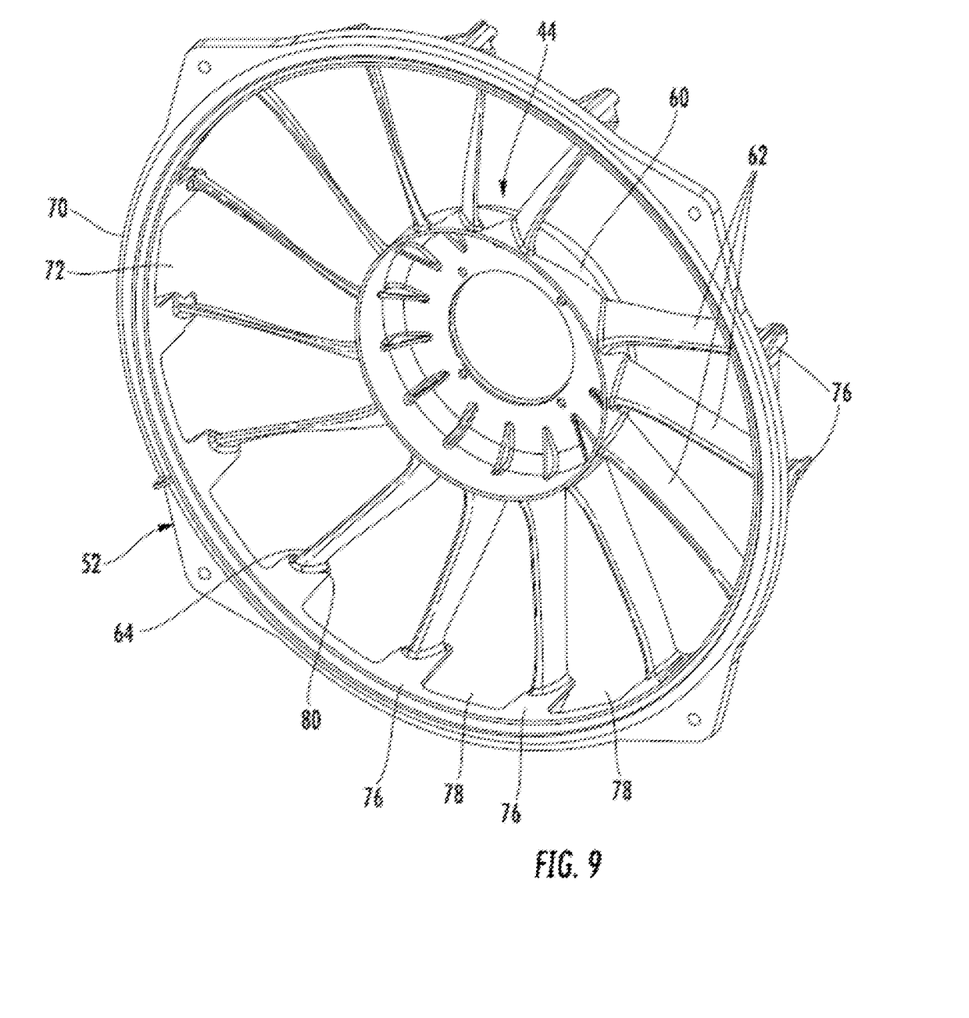
FIG. 9 is another perspective view of a stator and casing of the condenser fan assembly of FIG. 5 according to an embodiment.

With specific reference now to FIGS. 8 and 9, the stator 44 and casing 52 of the condenser fan assembly 40 are illustrated in more detail. As shown, the casing 52 includes a cylindrical shroud frame 70 having a hollow interior 72 configured to define the opening 50 within which the fan rotor 43 is received. The inner diameter of the shroud frame 70 is slightly larger than the outer diameter of the fan rotor 43 to avoid interference during operation of the fan assembly 40. Unlike conventional casings 52 which typically extend from an inlet end to a discharge end of a fan assembly 40, the shroud frame 70 of the casing 52 extends over only a portion of the axial flow length of the fan assembly 40. In the illustrated, non-limiting embodiment, an axial length of the shroud frame 70, measured parallel to the fan axis X, is selected such a downstream surface 74 of the shroud frame 70 is arranged upstream from the stator hub 60. As a result, no portion of the shroud frame 70 is arranged concentrically with the stator hub 60. Alternatively, or in addition, the axial length of the shroud frame 70 may be less than an axial length of the fan blades 46 of the fan rotor 43.

The casing 52 additionally includes a plurality of pylons 76 extending from the downstream surface 74 of the shroud frame 70. Although the pylons 76 are illustrated as being substantially perpendicular to the downstream surface 74, pylons 76 oriented at any angle to the downstream surface between 0 and 90 degrees are contemplated herein. The pylons 76 may be integrally formed with the shroud frame 70, or alternatively, may be connected thereto via any suitable means, such as fasteners for example. As shown, the pylons 76 are spaced at intervals about the periphery of the shroud frame 70 such that an opening 78 is formed between adjacent pylons 76. The pylons 76 may, but need not be equidistantly spaced based on the geometry of the surrounding components.

The plurality of pylons 76 provides structural rigidity to the shroud frame 70. Accordingly, the contour of each of the plurality of pylons 76 may be selected based on stresses anticipated during operation of the condenser fan assembly 40. In the illustrated embodiment, the circumferential width of each pylon 76 decreases along an axial length of the pylon 76. However, it should be understood that a pylon 76 having any contour as well as a plurality of pylons 76 having varying contours are within the scope of the disclosure. Further, the outer end 64 of each of the stator guide vanes 62 is connected to a corresponding pylon 76 of the casing 52, such as at a distal end 80 of the pylon 76 for example. In an embodiment, the stator 44 and the casing 52 may be integrally formed as a single component, such as via a die casting, plastic injection molding, or three-dimensional printing process for example. In other embodiments, the stator guide vanes 62 may be configured to removably or permanently connect to the pylons 76 via any suitable mechanism, including but not limited to fasteners, welds, and/or interlocking connectors for example.

The pylons 76 projecting downstream from the shroud frame 70 maximize the distance between the fan blades 46 and the guide vanes 62 to minimize noise generated during operation of the condenser fan assembly 40. Further, by using a plurality of spaced pylons 76 rather than a conventional casing 52 having a solid sidewall, significantly sized openings 78 are formed between adjacent pylons 76. Because the condenser fan assembly 40 is positioned in close proximity to the evaporator housing 36, i.e. such as a distance of less than 4 inches in some embodiments, a portion of the airflow A downstream from the rotor 43 is able to turn and exit the fan assembly 40 radially through these openings 78 due to the proximity to the evaporator housing 36. As a result, radial turning of the entire flow occurs much sooner than if the condenser fan assembly 40 included a conventional casing extending the full length (i.e. from inlet end to discharge end) of the fan assembly 40.

In an embodiment, the construction illustrated and described herein, reduces the total power required by the condenser fan assembly 40, such as in a transport refrigeration unit 20, by 40% or more when used in close proximity to the evaporator housing. As used herein the term close proximity, may refer to clearances between the discharge end of the fan assembly 40 and the evaporator housing 36 of up to about 4 inches. Further, the construction illustrated and described herein, reduces the total power required by the condenser fan assembly, such as in a transport refrigeration unit 20, by up to about 50% when used in constructions of a transport refrigeration unit where the clearance between the discharge end of the fan assembly 40 and the evaporator housing 36 is equal to or greater than about 4 inches.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration unit for use with a transport trailer comprising:
   a structural framework mountable to a wall of the transport trailer;
   a condenser heat exchanger unit mounted to the structural framework;
   an evaporator housing separated from the condenser heat exchanger by a distance; and at least one condenser fan assembly positioned aft of the condenser heat exchanger unit and forward of the evaporator housing, the at least one condenser fan assembly including:
- a fan rotor defining an inlet end of the at least one condenser fan assembly, the fan rotor being rotatable about a fan axis;
- a casing extending downstream from the fan rotor relative to an airflow and defining an outlet end of the at least one condenser fan assembly, wherein a flow path of the airflow between the inlet end and the outlet end is arranged parallel to the fan axis, the casing having a central opening and the fan rotor being arranged within the central opening, wherein the casing is radially offset from the fan rotor, the casing including:
  - a cylindrical shroud frame having an upstream surface and a downstream surface opposite the upstream surface, the upstream surface being positioned closer to the inlet end than the outlet end;
  - a plurality of circumferentially spaced pylons extending perpendicularly from the downstream surface of the shroud frame, the plurality of pylons being integrally formed at a first end with the downstream surface of the cylindrical shroud frame, wherein a width of the plurality of pylons measured in a plane oriented perpendicular to the fan axis varies over an axial length of the plurality of pylons measured parallel to the fan axis; and
  - a plurality of openings defined between adjacent pylons of the plurality of pylons, wherein a portion of the airflow moving through the at least one condenser fan assembly is expelled from the fan rotor radially via the plurality of openings; and
- a plurality of guide vanes arranged downstream from the fan rotor and the plurality of pylons with respect to the airflow, each of the plurality of guide vanes having a first end connected to a distal end of a respective pylon of the plurality of pylons such that the first end of the plurality of guide vanes is axially offset from the downstream surface of the cylindrical shroud frame, wherein the guide vanes are configured to straighten the airflow.

2. The transport refrigeration unit of claim 1, wherein substantially all of the airflow output from a discharge end of the at least one condenser fan assembly turns radially relative to the fan axis at a position upstream from the evaporator housing relative to the airflow.

3. The transport refrigeration unit of claim 1, wherein the shroud frame has a planar configuration.

4. The transport refrigeration unit of claim 1, wherein an axial length of the shroud frame, measured parallel to the fan axis, is less than an axial length of the fan rotor measured parallel to the fan axis.

5. The transport refrigeration unit of claim 1, wherein the fan rotor includes a plurality of fan blades and an axial length of the shroud frame measured parallel to the fan axis is less than an axial length of the plurality of fan blades measured parallel to the fan axis.

6. The transport refrigeration unit of claim 5, wherein the plurality of pylons maximize a distance between the plurality of fan blades and the plurality of guide vanes.

7. The transport refrigeration unit of claim 1, wherein fan rotor further comprises a central hub, and the shroud frame is axially offset from the central hub.

8. The transport refrigeration unit of claim 7, wherein the shroud frame is arranged upstream from the central hub.

9. The transport refrigeration unit of claim 1, wherein the plurality of pylons is spaced equidistantly.

10. The transport refrigeration unit of claim 1, wherein the plurality of pylons includes a first pylon, a second pylon, and a third pylon, and a distance between the first pylon and the second pylon is different that a distance between the second pylon and the third pylon.

11. The transport refrigeration unit of claim 1, wherein the shroud frame, the plurality of pylons, the stator hub, and the plurality of guide vanes are integrally formed.

\* \* \* \* \*